Oct. 17, 1950 R. B. THOMPSON ET AL 2,525,842
LIQUID CLARIFYING APPARATUS
Filed May 27, 1947 4 Sheets-Sheet 3

INVENTOR
Robert B. Thompson
Neil Munro
BY Alexander D. Marriott
Arthur Middleton
ATTORNEY Oct. 17, 1950  R. B. THOMPSON ET AL  2,525,842
LIQUID CLARIFYING APPARATUS
Filed May 27, 1947  4 Sheets-Sheet 4
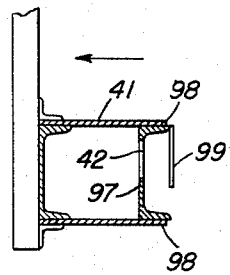
Fig. 5.
Fig. 6.
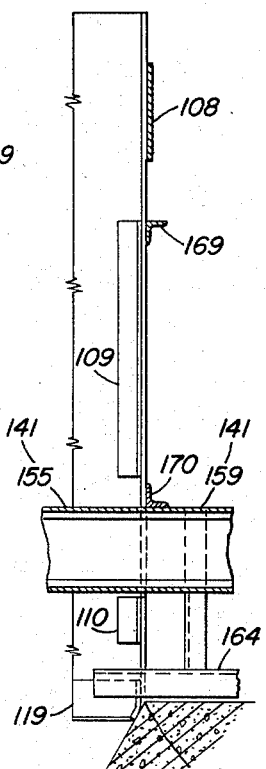
Fig. 7.
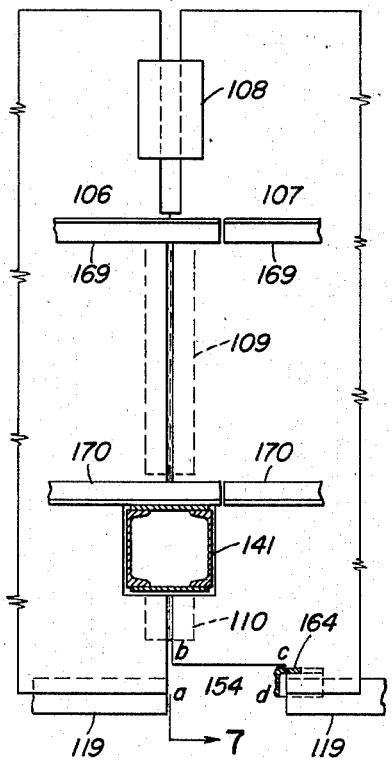
Fig. 8.
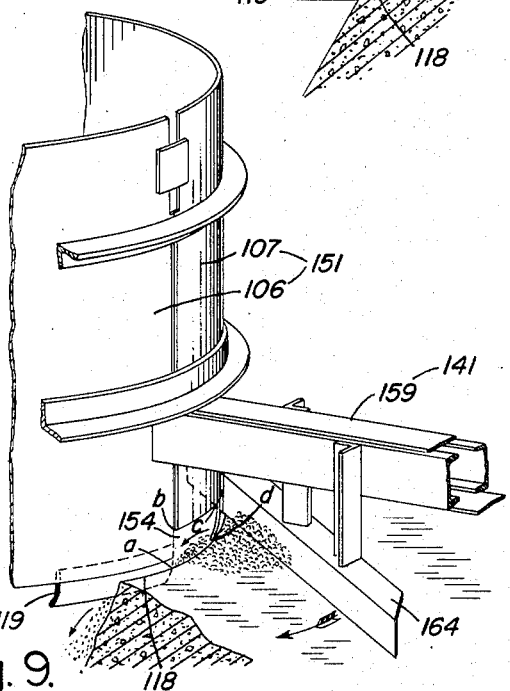
Fig. 9.
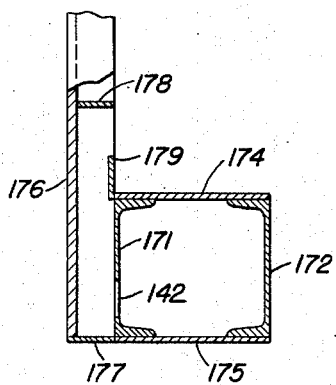
Fig. 10.
INVENTOR
Robert B. Thompson
Neil Munro
BY Alexander D. Marriott
Austin Middleton
ATTORNEY Patented Oct. 17, 1950

2,525,842

UNITED STATES PATENT OFFICE 2,525,842

LIQUID CLARIFYING APPARATUS

Robert B. Thompson, Wilton, and Neil Munro, Greenwich, Conn., and Alexander D. Marriott, White Plains, N. Y., assignors to The Dorr Company, New York, N. Y., a corporation of Delaware Application May 27, 1947, Serial No. 750,770

9 Claims. (Cl. 210—16)

This invention relates to the clarification of turbid liquids in whose clarification flocculation and sedimentation are employed. Such turbid liquids include water to be softened, and mother liquor from which chemical precipitates are to be removed from suspension. This invention is directed to a novel form of apparatus for realizing the desired effects of flocculation and sedimentation.

Apparatus for such purposes are well known, as for example, that apparatus is shown in the Darby et al. U. S. Patent No. 2,259,221, granted October 14, 1941. In the Darby et al. patent there is shown a cylindrical tank and a feed-supply means embodying a set of motivated feed distributing arms located in the lower portion of the tank and turnable about a vertically-extending axis centrally located in the tank. These arms carry vertically-extending paddles rising therefrom and constituting liquid-impelling elements which move in closed circular paths about said axis. A fixed transverse member extends across the tank above the rotating feed arms; this member supports downwardly-extending members which are staggered so that the moving baffles may pass between them. The latter function chiefly as deflectors for the baffles. The principal feature of the patent is a central fixed sump member positioned well above the bottom of the tank. But that sump member is closed at the bottom and has effluent conduit means which, because of possible interference with the rotating blades, leave the tank above the top level of the sump member.

Our invention aims to improve upon the Darby patented apparatus for the clarification of turbid liquids by providing in the clarification tank a central sump or depressed sludge-pocket which is lower than the floor of the tank. Above this sump is a hollow partition, open at the top and bottom, which is connected to a rotating vertical and central shaft. The partition turns with the shaft and provides an inner zone of quiescence wherein suspended solids or flocs may settle unhampered and form rather disperse sludge. The partition is so constructed as to leave a narrow, restricted one-way passageway between the partition and the walls of the sump or tank floor; through this passage the heavier sludge or slime which is moved toward the center of the tank by the conventional rake arms may pass into the sump and commingle with the less-dense solids settled from the quiescent zone. In other words, the partition is so constructed that the heavier sludge forms a yieldable seal between the outer or sludge blanket zone and the inner or quiescent zone which permits rotation of the partition while still insuring that the flocculation and agitation occurring in the sludge blanket are not interfered with. The sludge blanket zone contains a rather sharply delineated elevation, above which the liquid is clear and below which the liquid is very turbid and agitated; it is important that the sludge blanket be kept at least at a certain minimum thickness but it is equally important that some of the solids be removed from the tank. This invention achieves these results. An additional factor deserving of consideration, is that moving blades in the quiescent zone thicken the settled solids therein and impel them to the discharge portion of the sump.

A preferred embodiment of the present invention employs feed-distributing arms turnable about a vertical axial line located substantially in the center of the tank. Within the tank is a central shaft, preferably hollow, which can be rotated by conventional means such as a motor and associated gears. This shaft carries the feed-distributing arms which extend out into the tank; the feed-distributing arms also perform raking and stirring functions. These functions are accomplished by having rakes extend downward from the arms and by having vertical baffles extend upwardly from the arms. In the quiescent zone referred to above there are no vertical baffles but there are some downwardly-extending sludge thickening blades or rakes. The rotating partition is positioned as indicated above and extends downward into the previously-described sump. Above the partition lies fixed transverse members which support the downwardly-extending, staggered deflector blades, as described in the Darby patent.

In operation, the turbid liquid is fed to the tank up through the central hollow shaft; it flows out through the feed-distributing arms and enters the sludge-blanket zone through perforations in the feed-arms which are beyond the quiescent zone. In the sludge blanket zone flocs of solids form by the action of the stirring baffles and deflectors. Floc formation may be aided by addition of chemicals. The clarified liquid flows upwardly and leaves the tank at a top annular overflow launder. Settled flocs and other solids from the sludge blanket zone are raked toward the center of the tank and operate to form the yieldable sludge-seal around the rotating partition previously described. At the top level of the sludge blanket, some of the flocs and turbid liquid may enter the top of the quiescent zone and thereby settle to the bottom of the sump in the form of disperse solids which are raked by the thickening blades to the bottom solids-discharge conduit. Thus, there is provided in the tank a means for removing portions of the solids while still positively maintaining a minimum level (as defined by the top of the partition) of the sludge blanket.

In the Darby et al. Patent No. 2,259,221 there is shown means for supplying chemical or dosing liquid into the region served by the overlapping paddles and blades and likewise in the apparatus hereof there is usually employed means for supplying dosing chemicals to the liquid undergoing treatment therein.

Further objects or features of the invention hereof will be apparent from the detailed description which follows:

The invention is illustrated in the accompanying drawings which disclose embodiments of the invention which are best known to us just now. But the embodiments hereof are to be taken only as illustrative or indicative of other possible embodiments, so for the metes and bounds of this invention attention is directed to the appended claims.

In said drawings:

Fig. 5 is a vertical cross-sectional view of a flow-distributing rake-carrying arm, namely, a cross-section of the arm used in the form of apparatus of Figs. 1 and 2;

Fig. 6 is a vertical cross-sectional view of a modified form of cross-section usable in a flow-distributing rake-carrying arm such as that shown herein;

Figs. 7, 8 and 9 are views respectively shown in vertical cross-section, in vertical partial elevation looking in a radial direction, and in perspective operative relative position of a portion of a flow-distributing rake-carrying arm, a portion of the cylindrical shell carried by rake-carrying arms, portions of flexible sludge-sealing strip in engaging contact with a bottom or sump portion of a liquid-holding tank of the apparatus, and of a portion of a raking blade or element dependingly carried from the flow-distributing arms and extending through a sludge-transfer passage or cut-out left in the lower portion of the shell.

Fig. 10 is a detail view in cross-section of a flow-distributing arm construction adaptable for employment in any unit of the type herein described.

Figure 1:
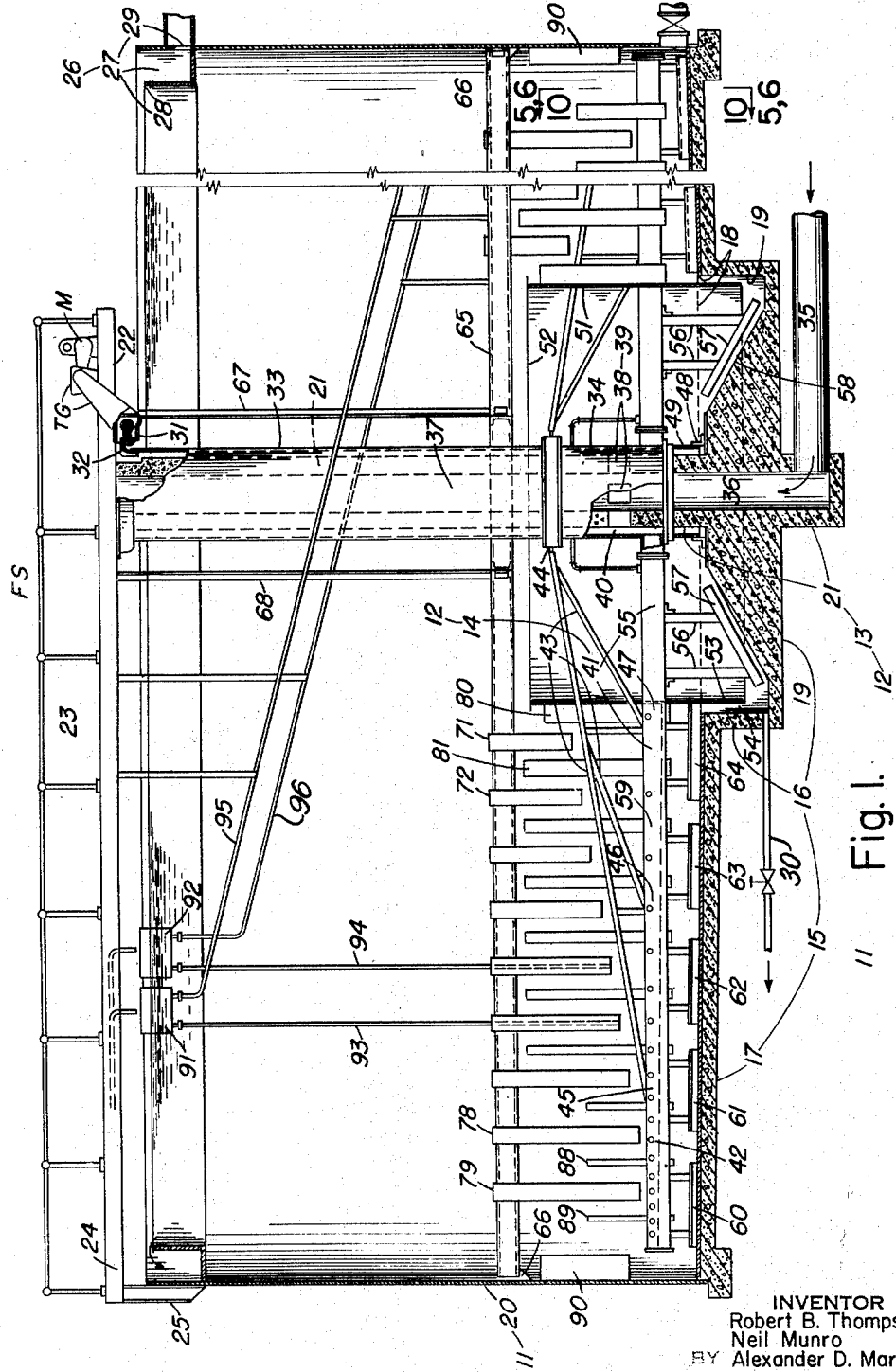
Fig. 1 is a vertical sectional view, partially broken away, of one form of unit or apparatus for clarifying liquids.
Figure 2:
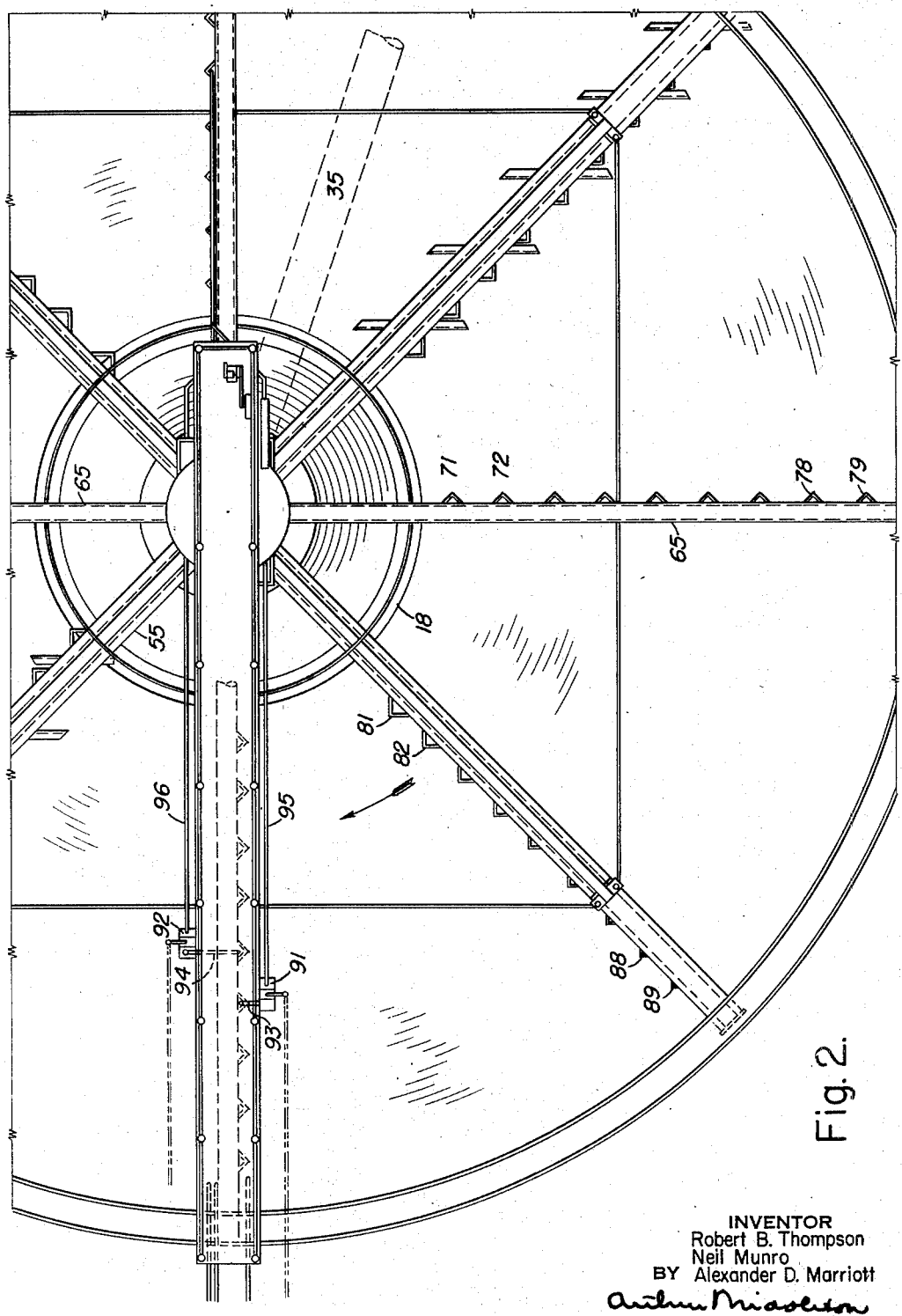
Fig. 2 is a partial plan view of the form of unit shown in Fig. 1.
Figure 4:
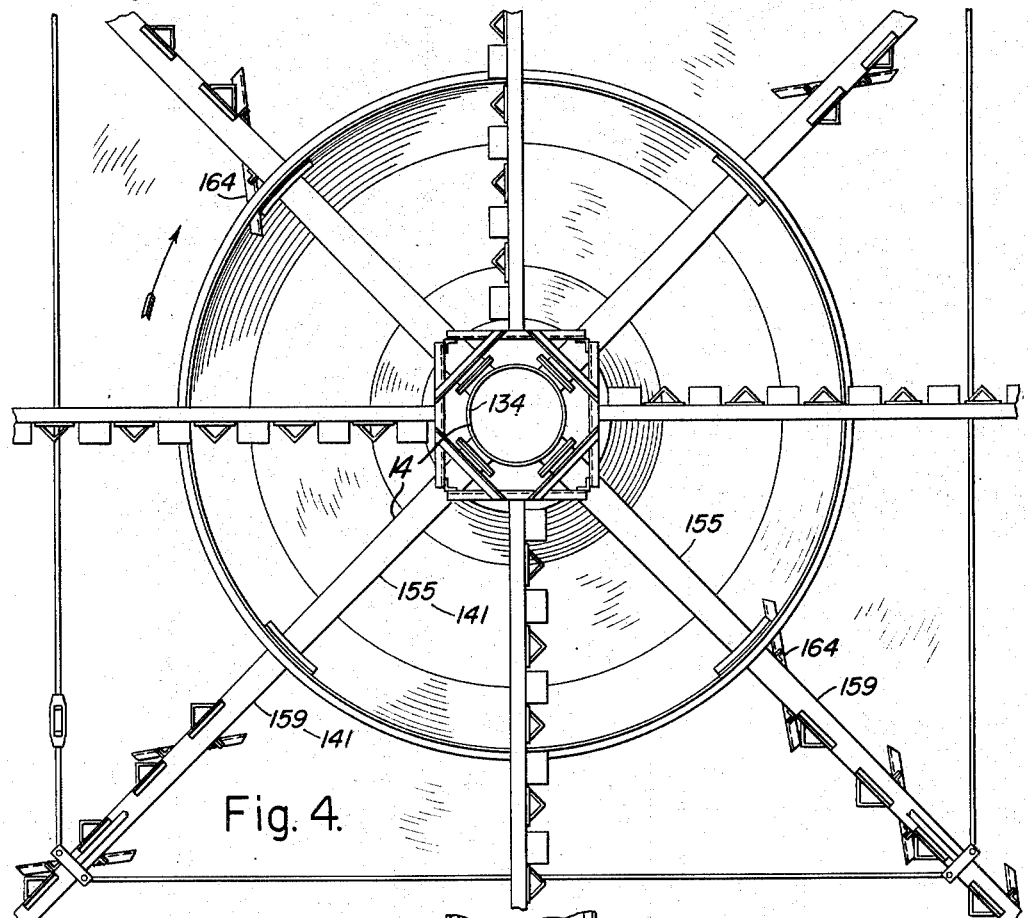
Figs. 3 and 4 are respectively a partial vertical sectional view and a partial plan view showing a central portion of a modified form of clarifying unit or apparatus.

Reference is now made to the drawings in detail:

Respecting the apparatus or unit of Figs. 1 and 2.

The apparatus or unit of these figures has a tank or basin 11 provided for receiving liquid to be treated therein as through the medium of a suitable feeding means collectively designated as 12 and which may be viewed as including a stationary feed-supply section 13 and a movable feed-distributing section 14 by which the incoming liquid to be treated is distributively delivered into the lower interior portion of the tank. The tank has a bottom 15 having a centrally-disposed depressed portion or sump-providing section 16 and an outlying annular portion 17 serving as a settling floor area surrounding and extending inwardly to the top edge 18 of a descending circular wall portion 19 of the sump-providing section.

The tank or basin has a marginal wall 20 rising from the bottom 15. This marginal wall 20 is preferably but not necessarily of cylindrical formation. Any suitable material may be employed in constructing the tank or basin. In the form shown the bottom 15 is of concrete while the marginal wall 20 is of metal such as sheet steel. A central hollow column or pier 21 rises from the sump-providing section 16 and may serve as part of the feeding means 12 and also as an upstanding strut for supporting the inner end 22 of a walkway structure 23 and also for affording support either directly or indirectly for the movable distributing section 14 of the feeding means 12.

The outer end 24 of the walkway structure 23 is in turn supported in fixed position or elevation with respect to the tank as through the medium of a short strut means 25 fixed to and rising from the marginal wall 20 of the tank. The unit hereof is provided with an effluent outflow means 26 leading from the upper interior portion of the tank and serves to define the normal operative surface level of the body of liquid undergoing clarification or other treatment within the tank. As built the outflow means embodies an effluent launder 27 having an overflow weir edge 28 that determines the overflow elevation or normal operative surface level of the liquid body in the tank and there is a discharge passage 29 leading from the launder to a region outside of the apparatus.

The unit also has a valve-controlled discharge pipe or sludge conduit 30 leading from the lower interior portion of the sump-providing section 16 to a region outside of the tank.

The center pier 21, the walkway structure 23 and the short strut means 25 collectively constitute a fixedly positioned construction or structure FS by and from which a main turntable base member 31 of constant elevation derives carrying support therefrom. Upon this turntable base there is a turntable 32 provided as by a bull gear mounted so as to have turnable movement about a vertical axial line concentric with the annular portion 17 of the tank bottom 15. There is also carried by and from the supporting construction FS just referred to a motor M and speed-reducing and power-transmission gearing TG, whereby to effect turning movement of the turntable or bull gear 32 and the parts carried thereby, or therefrom, about said vertical axis. From this turntable or bull gear 32 there is dependingly carried a cage or cylindrical member 33 that surrounds the pier or hollow column 21. To the lower end of this cylindrical member or cage 33 there is attached or included as part thereof a distributing drum or well-providing member 34 of the movable feed-distributing section 14 of the feeding means 12. The details of this feed-distributing section 14 will later be described.

As to the stationary feed-supply section 13 of the feeding means 12 this includes an inflow conduit or section 35 extending into the depressed central portion 16 and a rising continuing conduit section 36 leading upwardly to or into the central section 37 of the pier 21. This hollow pier or rising conduit section 36 has outflow feed-transfer-passage-openings 38 providing submerged ports collectively constituting feed-passage and transfer area 39 leading to an annular feed-transfer region 40 outside of the pier and within the distributing drum or well-providing member 34 which as already indicated may be viewed as located at or provided by the lower end portion of the depending carrying cage or cylindrical member 33 and which it will be noted surrounds and is spaced from the pier 21. The distributing drum or well-providing member 34 is sometimes herein referred to as a vertically-extending hollow shaft that functions as carrier for hollow rake-carrying arms 41 that are in constant hydraulic communication with the hollow rake-carrying shaft or well 34 whereby feed liquid can pass from said shaft or well 34 into and along the hollow arms 41 for delivering as feed material from said arms through horizontally-spaced discharge openings or discharge orifices 42 leading therefrom. Because the flow of feed liquid is from said shaft or well 34 into, along and ultimately from the hollow arms 41, these arms are sometimes referred to as flow-distributing arms. The discharge of liquid from said arms is in a general rearward direction since the discharge orifices 42 thereof and the associated parts tend to direct the feed liquid in a direction opposite that in which the arms turn.

From that which has preceded, it will be manifest that the movable feed-distributing section 14 of the feeding means includes the turnable cage or shaft 33, the lower hollow shaft or distributing drum or well 34 and the hollow flow-distributing rake-carrying arms 41. This feed-distributing section 14 also includes downwardly- and outwardly-extending tension members collectively designated 43 the upper inner end portions 44 of which are connected to the cage or cylindrical carrier 33 and the outer end portions of which are connected as at 45, 46 and 47, to the arms 41 so as to afford carrying support therefor.

To discourage the escape of incoming feed liquid from the juncture or location whereat the stationary feed-supply section 13 and the turnable feed-distributing section 14 approach each other—or as otherwise expressed, whereat the turnable well member or distributing drum 34 engages or approaches the stationary feed-supply section 13—there are provided co-operating juxtapositioned concentrically disposed annular portions or members of which one is provided as by an annular ring 48 stationarily fixed to the depressed bottom portion 16 of the tank, to wit, concentric with the aforementioned axial line, while the other or distributing-well member 34 is provided by a cooperating annular portion 49 embodied on or carried at the lower end of the distributing well or hollow shaft section 34.

Reference has been made to the fact that an important aspect of the invention revolves about the novel embodiment of a composite sludge pocket provided in the lower central portion of the tank. More specifically the composite pocket construction is provided by a shell member 51 preferably circular in plan carried by the flow-distributing arms 41.

In the form shown the shell member 51 provides the hollow partition referred to. It is of cylindrical formation and has the upper portion rising from the arms of which the upper edge 52 is at an elevation only part way upwardly within the body of the liquid within the tank, to wit, an elevation substantially lower than that of the overflow weir 28. The shell also has a lower portion extending downwardly from the arms and of which the low edge portion 53 extends into the depressed sump-providing section 16, to wit, to an elevation lower than that of the top edge 18 of the descending wall portion 19 of the depressed sump-providing section.

The exterior of the cylinder, or as otherwise expressed, the lower end of the shell circular in plan is of outside diameter somewhat less than that of the interior of the descending wall section 19 whereby to leave and provide a restricted sludge-transfer area 54 leading from the outlying annular settling floor area, to wit, from the top edge 18 referred to downwardly into the sump.

Portions 55 of the flow-distributing arms 41 located within the shell 51 are imperforated and carry therefrom through the medium of depending rods 56 sludge-engaging blades 57 operable over and along the inclined floor section 58 of the sump and provided whereby to thicken and impel sludge within the lower portion of the sump.

Portions 59 of the flow-distributing arms, to wit, portions thereof that extend outwardly beyond the cylindrical shell carry downwardly-extending sediment-engaging and impelling blades as 60, 61, 62, 63 and 64, that are horizontally inwardly and rearwardly inclined with respect to the radial line whereby as the arms are turned in a forward clockwise direction—looking downwardly upon the arms—there is a progressive raking and conveying of sludge or sedimented material from diverse sections of the outlying annular floor area and an impelling of the thus raked sludge or sediment towards, over and into the sludge-transfer area 54 left between the inner face of the sump wall 19 and the exterior of the lower end portion 53 of the circular shell 51.

Flocculation means is provided within the lower portion of the tank. This means includes a horizontally-extending supporting bar 65 at elevation slightly above that of the top edge 52 of the circular shell 51. This bar is preferably stationarily fixed in and with respect to the tank as by connecting members 66 between the ends thereof and the tank wall 20. It may also derive further carrying support as through the medium of members 67 and 68 depending from the aforementioned fixedly positioned construction by and from which the stationary turntable member 31 is supported. This bar is provided for supporting horizontally-spaced baffles as 71, 72—78, 79 extending downwardly therefrom.

The rake-carrying or flow-distributing arms 41 carry horizontally-spaced agitating blades 80, 81—88, 89 rising therefrom and movable therewith. Said baffles and blades are arranged with respect to each other whereby as the arms are turned about the vertically-extending axis therefor the horizontally-spaced blades turn in circular paths by and between, as the case may be, the depending baffles. The blades function as liquid-impelling paddles, while the baffles function as liquid-deflecting members. The respective adjacent blades and baffles are of sufficient length whereby they have what may be viewed as having effective overlapping arrangement.

In the form shown the sets of agitating blades and the sets of deflecting baffles each embody members of varying widths and varying lengths. As to the widths of the blades and the widths of the baffles, those of greater widths are innermost, while those of the lesser width are outermost. As to the length of the agitating blades, in general those of greater length are innermost, while those of the lesser length are outermost. Reversely as to the length of the deflecting baffles those of lesser length are innermost, while those of greater length are outermost. In the unit of these figures baffle members 90 are shown as attached to and carried from the tank wall 20.

Chemical dosing tanks 91 and 92 are indicated. From tank 91 there extend valve-controlled chemical discharge pipes 93 and 95 leading to opposite sections of the interior of the tank. Likewise, from tank 92 there extend valve-controlled discharge pipes 94 and 96 leading to opposite sections of the interior of the tank. The discharge portions of these pipes are at regions "ahead" of the baffles or deflecting blades, to wit, at a location with respect thereto as shown in Fig. 2.

In Fig. 5 there is shown a cross-section of a flow-distributing arm 41 of the unit of Figs. 1 and 2. In this figure the arrow indicates the direction of movement—the forward clockwise direction of movement—for the arms. Therefrom in conjunction with Fig. 1 it will be noted that each arm 41 has a rectangular flow-passageway and that each orifice of the horizontally-spaced orifices 42 is provided in the upper portion of a vertical web section of a rearwardly-disposed channel shaped member 97 of which the flanges 98 thereof extend horizontally and rearwardly. For these arms 41 there is also provided a liquid-dispersing plate 99 carried by, extending along and depending from the upper flange of said orificed channel but terminating short of the lower flange. This arrangement is employed whereby to take advantage of possible dispersing and "widening" of the liquid discharged from the orifices or orificed portion 42 as said discharged liquid flows against and thence from liquid-dispersing plate 99 in a downward and an ultimate rearward direction whereby it passes as effectively dispersed and spread out liquid into the underlying or trailing regions of the liquid body within the tank.

In Fig. 6 there is shown a modified form for the cross-section of the arm. In this form the arm is made up of welded together channel members 100 and 101 of which the flanges 102 and 103 extend towards each other and through the lower flanges of which horizontally-spaced orifices as 142 are provided. Below the lower flanges there is connected an angle member 104 having a vertical leg secured to a lower flange 102 at a location ahead of the orifices 142 and in a manner so that the lower leg 105 extends rearwardly below the orifices whereby said angle member 104 functions as a flow-dispersing or distributing member that directs the discharged liquid in a rearward direction from the arm.

Respecting the modified form of apparatus indicated by Figs. 4 to 10 inclusive.

In general the structure of a unit or apparatus of this modified form is the same as that heretofore described in connection with Figs. 1 and 2. The modifying changes primarily exist in the mode of installing and embodying a turnably mounted shell that is circular in plan, specifically a cylindrical shell 151 that marginally defines the upper portion of the lowly-disposed sludge pocket in cooperative relationship with respect to a stationary depressed sump-providing section 116 that defines the lower completing portion of said pocket. The lowly-disposed sludge pocket thus provided is constructed for receiving sludge raked from an outlying annular portion 117, or from a surrounding settling floor area provided by said annular floor and impelled into the pocket through restricted sludge-passages or sludge transfer areas 154 as will hereinafter more fully appear. According to the unit of Figs. 4 to 10 inclusive depending flexible strips 119 carried from the lower edge portions of the shell 151 have operative engagement with circular portion of the tank bottom in the immediate vicinity of the upper marginal edge defining portion 118 of the sump for effectively providing a sludge seal except for small sludge passages provided by and because of cut-out portions or ports 154 left in the lower portion of the shell and into and through which cut-out portions or ports of the shell certain inwardly-disposed raking blades or elements 164 impart forward impelling thrusts effective to pass raked sludge through the restricted passage areas into the lower portion of the sludge pocket. The raking blades 164 are dependingly supported from the flow-distributing arms 141, to wit, from the orificed feed-distributing portions of the arms extending outwardly from the cylindrical sludge pocket shell 151. These restricted cut-out sludge transfer areas provided by the ports 154 correspond in functioning to that of the descending restricted sludge-transfer area or passageway 54 provided according to the arrangement of the construction heretofore described in connection with Figs. 1 and 2.

In the form of apparatus as modified by the showing of these Figs. 4 to 10 inclusive the tank or basin of which the bottom 115 includes an outlying bottom portion or section 117 providing an annular settling floor area and a centrally-disposed depressed portion or sump-providing section 116. The unit or tank of this modified form includes a feeding means 112 embodying a stationary feed supply section collectively designated as 113 and a movable feed-distributing section collectively designated as 114.

The stationary feed-supply section includes or provides a horizontally-extending inflow conduit 135 merging into an upflow conduit 136 that submergedly delivers the incoming feed into a low-liquid distributing well or tubular liquid-receiving section 134 provided at or by the lower end portion of a rake-arm carrying cage or turnably mounted depending hollow shaft designated as 133 and which is motivated in any suitable manner so as to turn, as for example, in a clockwise direction about a vertically-extending axial line.

The motivated feed-distributing section collectively designated as 14 embodies the distributing well or hollow shaft 134, the outwardly-extending rake-carrying arms or flow-distributing arms 141 as they are sometimes referred to. These arms are in constant hydraulic communication with the liquid-distributing well or liquid-receiving section 134 referred to and in fact are carried from and by said well or section 134. This well or section 134 is arranged so that a low circular portion 149 thereof has overlapping concentric arrangement with an annular ring 148 carried on the sump-defining section 116 and is so provided whereby to discourage the escape of incoming feed at and from the locality at which the low turnable section 134 of the flow-distributing means is in flow proximity to the stationary upflow conduit section 136 of the feeding means.

The turnable sludge-pocket shell 151 is carried by the rake-carrying or flow-distributing arms 141 and includes a rising portion which extends upwardly from the carrying arms therefor and terminating in an upper edge 152 and a portion 153 extending downwardly from said arms. The detail portions of the shell, which is preferably cylindrical, are shown in Figs. 7 and 8 and from which figures in conjunction with Fig. 9, it will be noted that the shell 151 is made up of two half cylinder sections 106 and 107 connected by plate members such as 108, 109 and 110. The resulting cylindrical construction is marginally reinforced by angle members such as 169 and 170, of which the angle member 170 constitutes or provides connecting means whereby the resulting cylinder is carried by and secured to the flow-distributing arms 141.

Digressing for a moment, it will be noted with respect to the flow-distributing arms 141 that the portions 155 thereof within the shell are imperforated and that from these imperforated portions there depend means 156 carrying sludge-engaging blades 157 that function within the sump and at and along the floor or lower interior face portions of the sump. A valve-controlled discharge pipe or sludge conduit 130 leads from the lower portion of the sump to a region outside of the apparatus.

In Figs. 7 and 8 one will note cut-out portions are provided in or for the lower portion of the resulting cylindrical shell and in this connection note the cut-out sections, each of which is marked *a*, *b*, *c*, and *d*, as is manifest from Fig. 8. These "cut-outs" provide the restricted sludge passages or transfer ports herein designated as 154.

Figure 3:
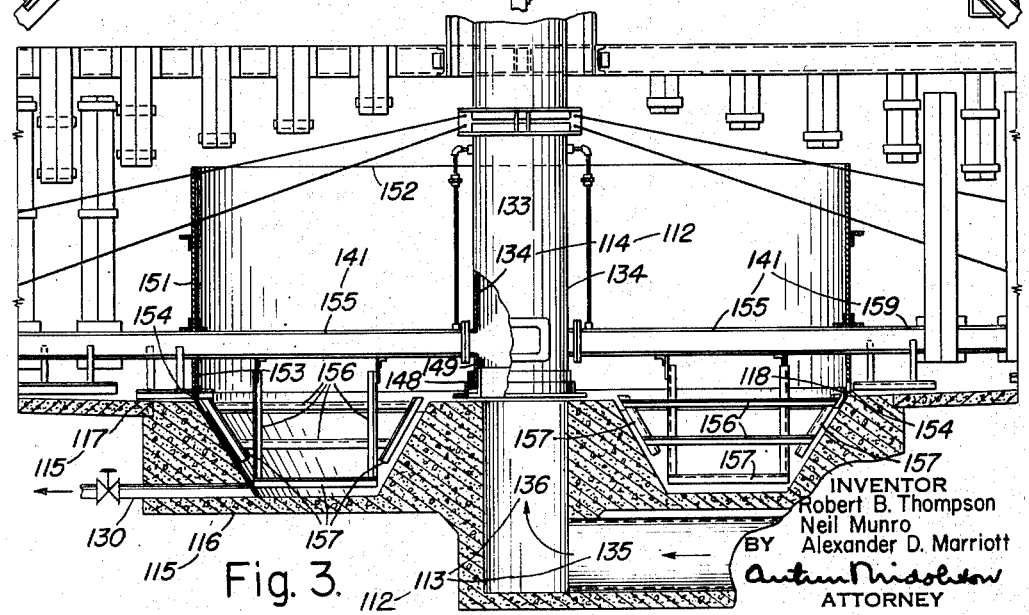

In these figures and also in conjunction with Fig. 3, one will note that the strips 119 of material connected to the lower edge portions 153 of the shell 151 are of lengths determined by the distance between the cut-outs or restricted sludge passages 154. These strips are preferably of flexible or yieldable material and extend downwardly and towards and in relatively sludge-sealing engagement with the contacted circular portion of the tank bottom, to wit, at the locality or in the vicinity of the upper sump edge as is manifest from Figs. 3 and 9.

In connection with the foregoing it will be noted that the cut-outs each as indicated by *a*, *b*, *c*, and *d* and the floor portion underlying the cut-outs complete the defining of the restricted sludge-passage area 154, to wit, as between the movable shell section 151 of the low-sludge pocket and the associated stationary sump-providing section 116 of the tank bottom. Furthermore, with respect to the raking blades carried by or from the portions 159 of the flow-distributing arms 141, as a set include not only blades which function over and along the outlying annular settling floor area but also inwardly-disposed raking blades or elements 154 which extend through these cut-outs whereby these blades as a set progressively rake and transfer sedimented solids from the outlying floor and whereby the transferred sludge-solids are impelled into the composite low-sludge pocket construction provided as described.

The apparatus of the modified form as per Figs. 4 to 10 inclusive embodies essential operating features of construction according to such as have already been described in connection with units of Figs. 1 and 2.

In Fig. 10 there is disclosed a cross-sectional view of a construction for use in flow-distributing arms suitable for employment not only in the modified form of apparatus but also in the form of apparatus or unit in Figs. 1 and 2. A flow-distributing arm built according to the rectangular cross-sectional formation outlined in Fig. 10 is made up of a front channel member 171 of which the web portion is foremost and is provided with horizontally-spaced orifices 142 along and through lower portions of the web. Flanges of this front channel member 171 extend rearwardly. The rectangular formation also includes a rearmost channel 172 with vertically-disposed web and positioned so that the flanges extend forwardly. These two channel members are connected by upper and lower horizontally-extending flat plates respectively designated 174 and 175. Paddles provided by vertically-extending angle members 176 V-shaped in cross-section and with the apex of the V foremost are secured to the front portion of the arm 141 and in a locality immediately ahead of the orifice openings 142. The lower ends of these V-shaped paddles are closed by closure plate 177 and another plate 178 is provided within the interior portion of the V's in vertically-spaced relationship with respect to the arm to which the particular V-shaped paddle is located whereby feed liquid passing from the orifice 142 must flow upwardly within the V-shaped paddle corresponding thereto over an overflow edge 179 but through a space below the plate 178 whereby the liquid thus passing from the interior of each rising V-shaped paddle is spreadingly delivered rearwardly upon and over the top plate 174 of the flow-distributing arm and trailingly from the latter.

From that which has preceded it will be apparent that sludge passed into the composite low sludge pocket construction can be retained therein in a relatively concentrated form until passed from the unit through the valve-controlled sludge-discharge pipe 130 to a region outside of the unit according to operative requirements or at the election of an operator. That within the portion of the tank outwardly-disposed with respect to said lowly-disposed sludge pocket there is employed agitating mechanism functional in a manner conducive to floc formation and coagulation, to wit, in a condition for realizing settleable flocs or solids depositing as sludge within said outlying region, or as otherwise expressed, to and upon the annular settling floor area referred to and from which the thus settled solids are progressively raked and passed as sludge into the pocket.

It will also be noted that the entire upper cross-sectional portion of the tank and for a very substantial depth thereof is available for receiving liquid clarified within the tank and from which the clarified effluent is passed to a region outside of the tank.

It will be manifest that the invention hereof may be embodied in various forms of construction while still continuing within the spirit and scope of the invention as herein claimed.

We claim:

1. An apparatus of the class described comprising a tank with an outlet for clarified effluent and having a bottom embodying a sump-providing structure with a sludge-discharge conduit leading therefrom; an inflow feed conduit with submerged delivery to the central portion of the structure; a vertically extending shaft turnably mounted with respect to the tank whose lower end is provided for receiving feed liquid passing thereto from said inflow conduit; means for imparting turning movement to said shaft; flow-distributing arms extending outwardly from said shaft and in hydraulic communication with the latter; a shell rising from said arms and extending downwardly to a floor portion of the tank in the immediate vicinity of the sump whereby to provide a sludge seal with respect to the floor but whereby there is left a restricted sludge passage between the depending portion of the shell and the bottom of the tank; and sediment-impelling means on said arms for impelling sludge towards and into the sludge passage whereby such sludge can pass into a lowly-disposed pocket compositely provided by the shell on the one hand and the sump-providing structure on the other hand.

2. Apparatus according to claim 1, in which the sludge-discharge conduit is a valve-controlled conduit; in which the flow-distributing arms are imperforated as to the portions thereof within the shell; in which the shell is cylindrical; and in which there is embodied sediment-engaging bladed means dependingly supported from the imperforated portions of the arms, movable with the arms and functionable to operatively engage and impel sedimented material transferred into and located within the compositively provided pocket.

3. Apparatus according to claim 1, in which the shell rising from the arms is cylindrical, in which the sump is provided in and by a depressed bottom section of which the marginal wall of the depressed section has for at least an upper interior portion thereof a cylindrical inner surface that is overlapped by a portion of the lower end of the cylindrical shell, the latter of which is of outside diameter less than that of the interior diameter of said upper portion of the sump whereby there is left an annular downflow passageway for raked and impelled sludge to pass thereto from the outlying settling floor area.

4. Apparatus according to claim 1, in which the shell has at the lower end portion thereof a sealing strip of flexible material arranged proximate the sump thereby providing a restricted passage between the tank floor and the sump.

5. Apparatus for clarification of turbid liquid comprising a tank with a bottom providing a floor with a depressed central sump section extending downwardly below the floor; means for feeding incoming liquid into the tank; means for withdrawing clarified effluent from the tank; agitating means for flocculating solids into settleable flocs which as they settle towards the floor progressively accumulate to form a sludge blanket in the lower interior portion of the tank; means for impelling settleable flocs from the region immediately above the floor towards the central sump; means for actuating said impelling means; a central vertically disposed open-top shell extending upwardly with respect to the floor and separating the sludge blanket in the zone outside of said shell from an inner quiescent settling zone within said shell; and means for removing sludge from said sump; said shell extending downwardly close to but in non-contacting relationship with the tank floor to provide hydraulic communication between the tank floor and the sump through the medium of a restricted one-way passage adapted to receive sludge impelled thereto from the floor which provides a yieldable sludge seal between the sludge blanket zone outside of the shell and the quiescent settling zone within the shell.

6. Apparatus according to claim 5, with the addition of sludge-thickening means within the sump.

7. Apparatus according to claim 5, but wherein the shell is substantially circular in plan and extends down inside the sump.

8. Apparatus according to claim 5, wherein a strip of flexible material extends from the lower portion of the shell to a position close to but not contacting the tank floor whereby a restricted sludge passage from the tank floor to the sump is formed.

9. Apparatus according to claim 5, wherein a strip of flexible material extends from the lower portion of the shell to a point adjacent to the sump walls.

ROBERT B. THOMPSON.
NEIL MUNRO.
ALEXANDER D. MARRIOTT.

REFERENCES CITED

The following references are of record in the file of this patent:

UNITED STATES PATENTS

| Number | Name | Date |
|---|---|---|
| 2,223,257 | Mallory | Nov. 26, 1940 |
| 2,223,258 | Mallory | Nov. 26, 1940 |
| 2,259,221 | Darby et al. | Oct. 14, 1941 |
| 2,263,168 | Dorr et al. | Nov. 18, 1941 |
| 2,274,361 | Darby | Feb. 24, 1942 |
| 2,289,112 | Fischer | July 7, 1942 |
| 2,355,069 | Green | Aug. 8, 1944 |
| 2,411,390 | Prager | Nov. 19, 1946 |
| 2,419,004 | Bieker et al. | Apr. 15, 1947 |